United States Patent
Wilcock

(10) Patent No.: US 8,190,743 B2
(45) Date of Patent: *May 29, 2012

(54) MOST ELIGIBLE SERVER IN A COMMON WORK QUEUE ENVIRONMENT

(75) Inventor: Glenn R. Wilcock, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 771 days.

This patent is subject to a terminal disclaimer.

(21) Appl. No.: 12/193,382

(22) Filed: Aug. 18, 2008

(65) Prior Publication Data

US 2008/0307111 A1    Dec. 11, 2008

Related U.S. Application Data

(63) Continuation of application No. 10/112,134, filed on Mar. 29, 2002, now Pat. No. 7,454,501.

(51) Int. Cl.
*G06F 15/173* (2006.01)

(52) U.S. Cl. .................. 709/226; 709/223

(58) Field of Classification Search ........... 709/223–226
See application file for complete search history.

(56) References Cited

U.S. PATENT DOCUMENTS

| | | | |
|---|---|---|---|
| 5,459,837 | A | 10/1995 | Caccavale |
| 5,758,077 | A | 5/1998 | Danahy et al. |
| 5,887,168 | A | 3/1999 | Patterson et al. |
| 5,991,808 | A | 11/1999 | Broder et al. |
| 6,185,611 | B1 | 2/2001 | Waldo et al. |
| 6,304,867 | B1 | 10/2001 | Schmidt |
| 6,601,084 | B1 | 7/2003 | Bhaskaran et al. |
| 6,845,393 | B1 | 1/2005 | Murphy et al. |
| 6,907,461 | B2 | 6/2005 | Ishmael et al. |
| 7,065,574 | B1 | 6/2006 | Saulpaugh et al. |
| 7,089,530 | B1 | 8/2006 | Dardinski et al. |

(Continued)

FOREIGN PATENT DOCUMENTS

CA    2282931    3/2001

(Continued)

OTHER PUBLICATIONS

Written Opinion and International Search Report mailed Mar. 26, 2004 in corresponding International Application No. PCT/EP0302674.

*Primary Examiner* — Aaron Strange

(74) *Attorney, Agent, or Firm* — Scully, Scott, Murphy & Presser, P.C.

(57) ABSTRACT

A system and method for managing servers. The system comprises a plurality of servers for processing messages, at least one client for transmitting messages to and receiving messages from the servers, and processor means for maintaining a list indicating whether at least one of the servers is eligible to process messages. Preferably, the servers are adapted to process messages of different types; and the processor means includes means to indicate on said list whether, for each of the different types of messages, at least one of the servers is eligible to process each of the different types of messages. Also, in the preferred embodiment, each of the clients includes means to read the list, before the client transmits a message of a given type to one of the servers, to determine whether at least one of the servers is eligible to process messages of the given type. In addition, the processor means may notify the clients when changes are made to the list, and each of the clients may include means for removing messages from the servers in case there is no longer a server eligible to process the messages.

13 Claims, 3 Drawing Sheets

U.S. PATENT DOCUMENTS

2002/0078263 A1   6/2002   Darling et al.

FOREIGN PATENT DOCUMENTS

| | | |
|---|---|---|
| EP | 1126371 | 8/2001 |
| EP | 1187016 | 3/2002 |
| JP | 63318662 | 12/1988 |
| JP | 10091595 | 4/1998 |
| JP | 2000259591 | 9/2000 |
| JP | 2001160038 | 6/2001 |
| WO | 94/20904 | 9/1994 |

MOST ELIGIBLE SERVER IN A COMMON WORK QUEUE ENVIRONMENT

RELATED APPLICATION

This application is a continuation of U.S. Ser. No. 10/112,134, filed Mar. 29, 2002, the entire contents of which are incorporated herein by reference.

BACKGROUND OF THE INVENTION

1. Technical Field

The present invention relates generally to parallel processing environments, and more specifically to parallel processing systems employing a shared queue.

2. Background Art

It is commonplace in contemporary data processing environments to provide a plurality of systems to handle the processing needs of one or more clients. For example, two or more systems, such as transaction processing systems, may be interfaced to one or more clients via a communications network. In this environment, when a client has a task to be performed by one of the systems, that client sends an input message to the desired system to request processing by an application running in that system. The subject system queues the message and provides the message to the application for processing. When processing is complete, the application places an outgoing message in the queue for transmission over the network to the client.

To take advantage of the multi-processing aspect of this environment, the system originally tasked by the client, system A, may extract the input message from its queue and forward the input message to a second system, system B, for processing. When processing is completed by system B, the response (outgoing message) is forwarded to system A and placed on system A's queue for transmission to the client. Thus, in this manner, multiple systems can be utilized to handle processing requests from numerous clients.

There are, however, a few disadvantages with this arrangement. For example, if system A fails, none of the work on the queue of system A can be accessed. Therefore, the client is forced to wait until system A is brought back online to have its transaction processed.

In order to address these disadvantages, a shared, or common, queue may be provided to store incoming messages for processing by any of a plurality of data processing systems. A common queue server receives and queues the messages onto the shared queue so that they can be retrieved by a system having available capacity to process the messages. In operation, a system having available capacity retrieves a queued message, performs the necessary processing, and places an appropriate response message back on the shared queue. Thus, the shared queue stores messages sent in either direction between clients requesting processing and the data processing systems that perform the processing.

Because the messages are enqueued onto the shared queue, the messages can be processed by an application running in any of a plurality of systems having access to the shared queue. Thus, automatic workload management among the plurality of systems is provided. Also, because any of the systems connected to the shared queue can process messages, an advantage of processing redundancy is provided. If a particular application that is processing a message fails, another application can retrieve that message from the shared queue and perform the processing without the client having to wait for the original application to be brought back on-line. This provides processing redundancy to clients of the data processing environment.

When utilizing a common work queue, all clients that submit requests onto the common queue have an expectation that their work request will be completed within a reasonable amount of time. In an environment where not all servers are eligible to process all requests, it is possible at any given time that there are no servers eligible to process some or all of the work requests on the queue. When a work request is synchronous, it is important that the client that submitted the request be notified that there is no server eligible to process its synchronous request.

More specifically, in a shared work queue environment, there are one or more clients that submit requests and one or more servers that process those requests. Of those servers that process requests, not all servers may have the ability to process each request on the common work queue. This may be the result of (a) a server has been configured to only process certain types of requests or (b) a server does not have access to the resources required to process certain types of requests. As an example for case (a), some servers may be configured to only process requests from certain clients, while other servers may be configured to process all requests. As an example for case (b), some requests may require access to certain storage pools that not all servers have connectivity to. Only servers that have connectivity to the required storage pool can process those requests.

SUMMARY OF THE INVENTION

An object of this invention is to improve data processing systems that use a common queue to process work requests.

Another object of the invention is to notify a client, who has submitted a synchronous request, whether there is a server eligible to process that request.

A further object of the invention is to prevent a synchronous request from being submitted for which there is no server eligible to process.

These and other objectives are attained with a system and method for managing servers. The system comprises a plurality of servers for processing messages, at least one client for transmitting messages to and receiving messages from the servers, and processor means for maintaining a list indicating whether at least one of the servers is eligible to process messages. Preferably, the servers are adapted to process messages of different types; and the processor means includes means to indicate on said list whether, for each of the different types of messages, at least one of the servers is eligible to process each of the different types of messages.

Also, in the preferred embodiment, each of the clients includes means to read the list, before the client transmits a message of a given type to one of the servers, to determine whether at least one of the servers is eligible to process messages of the given type. In addition, the processor means may notify the clients when changes are made to the list, and each of the clients may include means for removing messages from the common queue in case there is no longer any server eligible to process the messages. A queue server provides the necessary interface for the common queue. Any suitable queue server may be used, however, preferably the common queue server is the Coupling Facility available in the zSeries processing environment available from International Business Machines, Corp.

Further benefits and advantages of the invention will become apparent from a consideration of the following detailed description, given with reference to the accompanying drawings which specify and show preferred embodiments of the invention.

DETAILED DESCRIPTION OF THE PREFERRED EMBODIMENTS

The present invention generally relates to systems and methods that may allow any of a plurality of processing systems to process messages for one or more clients. In the preferred embodiment, a structured external storage device, such as a shared queue, is provided for queuing client messages for the plurality of systems. When incoming messages are received from the clients, they are placed on the queue. When one of the plurality of systems has available processing capacity, it retrieves a message, processes the message and places a response on the queue.

Figure 1:
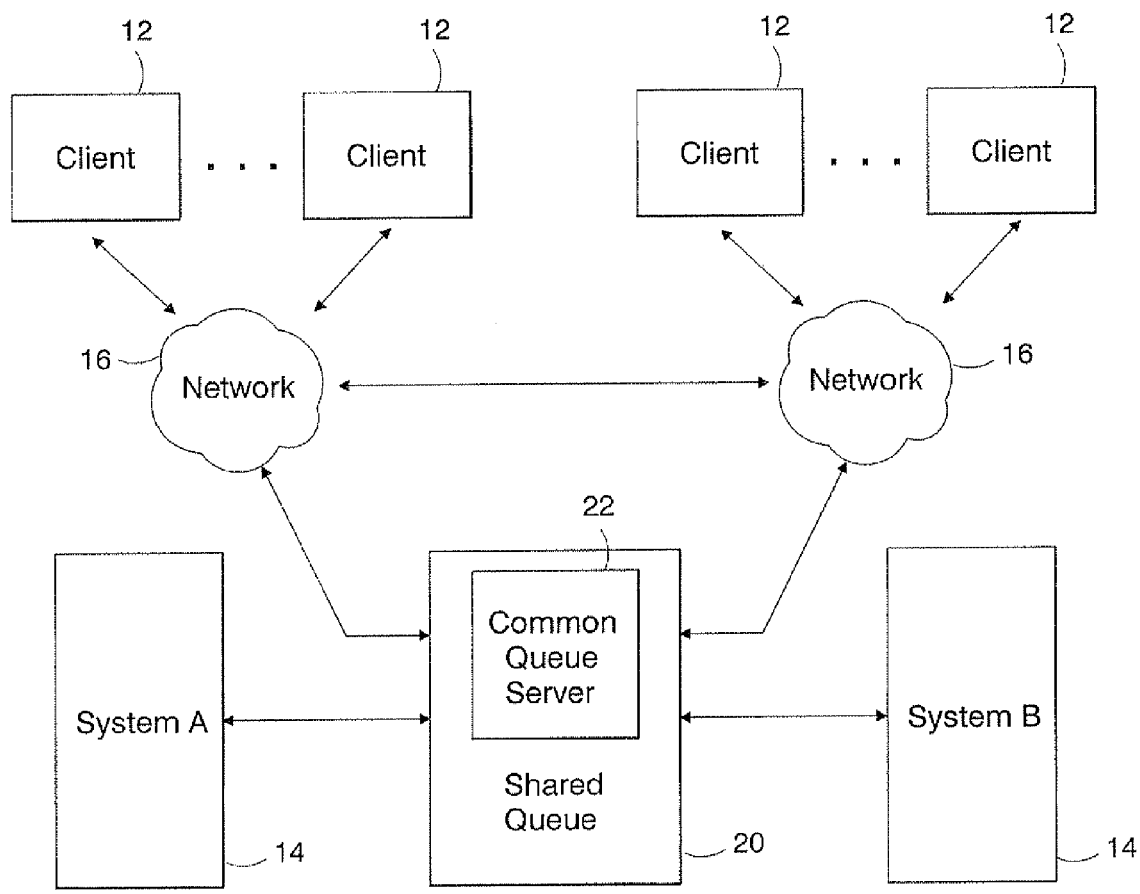
FIG. 1 is a block diagram showing a shared queue in a client/server environment.

FIG. 1 is a block diagram illustrating the shared queue in a client/server environment 10. The client/server environment includes one or more clients 12 interfaced to a plurality of processing systems 14 via one or more networks 16. When a client 12 has a transaction to be processed, the client enqueues the message onto shared queue 20. As additional messages are received from clients, they too are enqueued onto the shared queue. Each message remains on shared queue 20 until it is retrieved by one of the systems 14 for processing.

When a system 14 determines that it has the capacity to process another transaction, that system 14 dequeues a message from shared queue 20. That system 14 then processes the message and places on shared queue 20 the appropriate response to the client that generated the incoming message. A common queue server 22 provides the necessary interface between shared queue 20 and systems 14. When an input message is received by the common queue server for enqueueing onto shared queue 20, the queue server 22 buffers the message in one or more buffers and then transfers this data to the shared queue. Any suitable common queue and common queue server may be used in the practice of this invention. Preferably, though, the common queue server is the Coupling Facility available in the zSeries processing environment available from International Business Machines, Corp. This Coupling Facility provides various features used in the preferred implementation of the invention.

As mentioned above, one difficulty that can occur when a common work queue is used is that it is possible that at any given time, there are no servers eligible to process some or all of the work requests on the queue. To address this need, this invention utilizes a feature referred to as the "Most Eligible Server." The most eligible server is that server that has the greatest ability to process requests. By knowing the status of the most eligible server, clients may submit requests to the common work queue based on whether or not there is a server that is eligible to process that request.

In order to prevent a synchronous request from being submitted for which there is no server eligible to process, a "Most Eligible Server Status" (MESS) record is maintained. The MESS record indicates whether or not there is a server eligible to process requests, and if so, which types of requests are eligible to be processed. The number of servers eligible does not need to, but can, be maintained. The MESS record indicates that there is at least one server eligible to process requests, so that requests do not remain on the queue for an indefinite amount of time. Before submitting a request, a client quickly reads the MESS record to determine if there is a server eligible to process its request. If so, the client then places its request onto the queue.

Preferably, if there is a change in the MESS record, then clients are notified of the change. If the MESS is lower than its previous status—that is, no server is eligible or certain types of requests can no longer be processed—then the client has the option of removing its requests from the queue for which there is no longer a server eligible to process.

Figure 2:
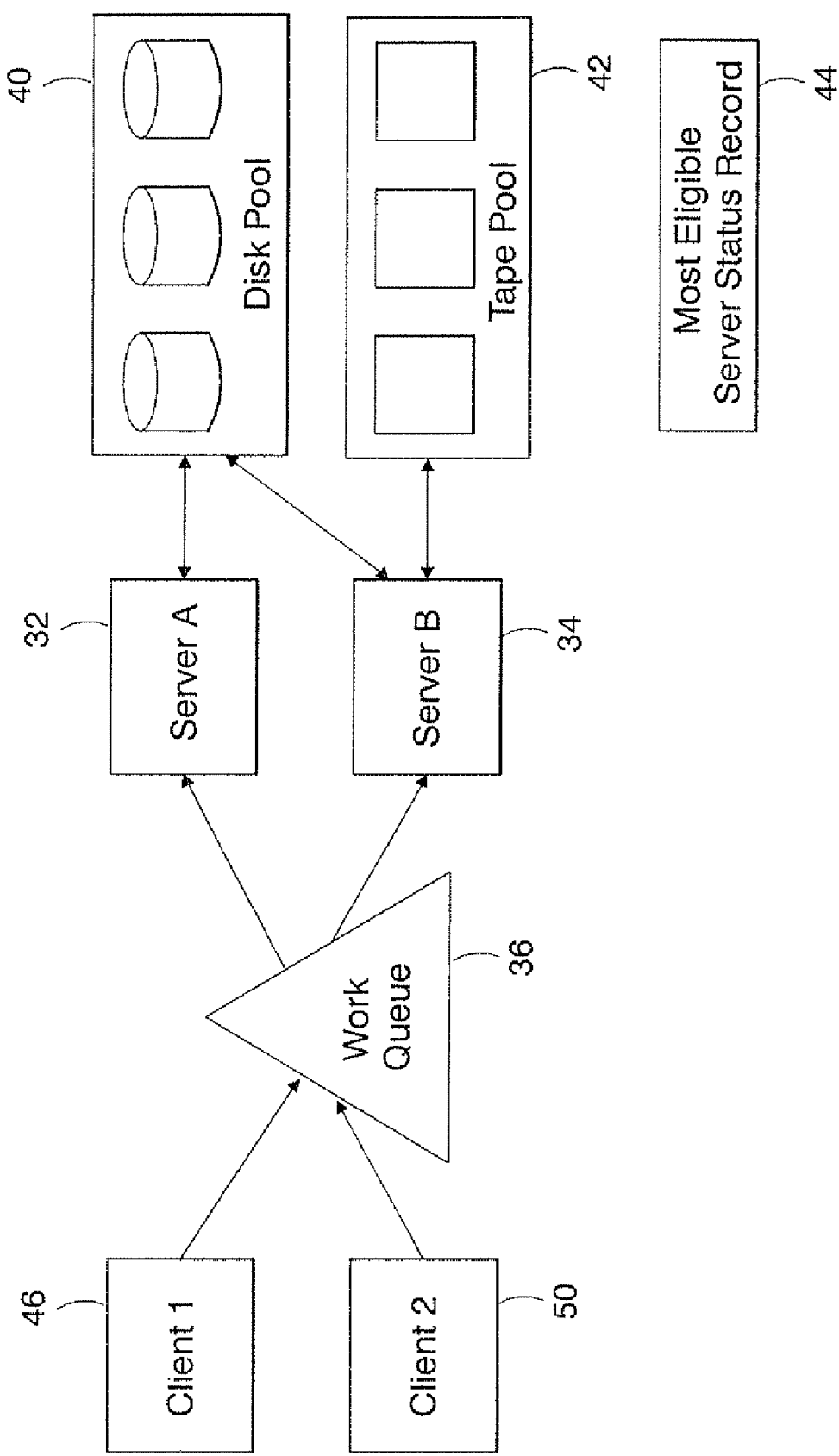
FIG. 2 shows a shared queue processing environment in which a most eligible server status record is used.

FIG. 2 illustrates an environment in which a most eligible server status record may be used. As an example, two servers 32, 34 are processing requests from a common work queue 36. Both Servers are connected to a Disk Pool 40, but only one of the servers can be connected to the Tape Pool 42. Server 34 is the only server that can process requests that require a Tape Resource. As long as Server 34 is available, the MESS record indicates that there is a server available to process requests requiring tape. When Server 34 is not available, then the MESS record 44 is updated to indicate that there are no servers available to process tape requests, and Clients 46 and 50 can fail existing outstanding tape requests and submit new requests accordingly.

Figure 3:
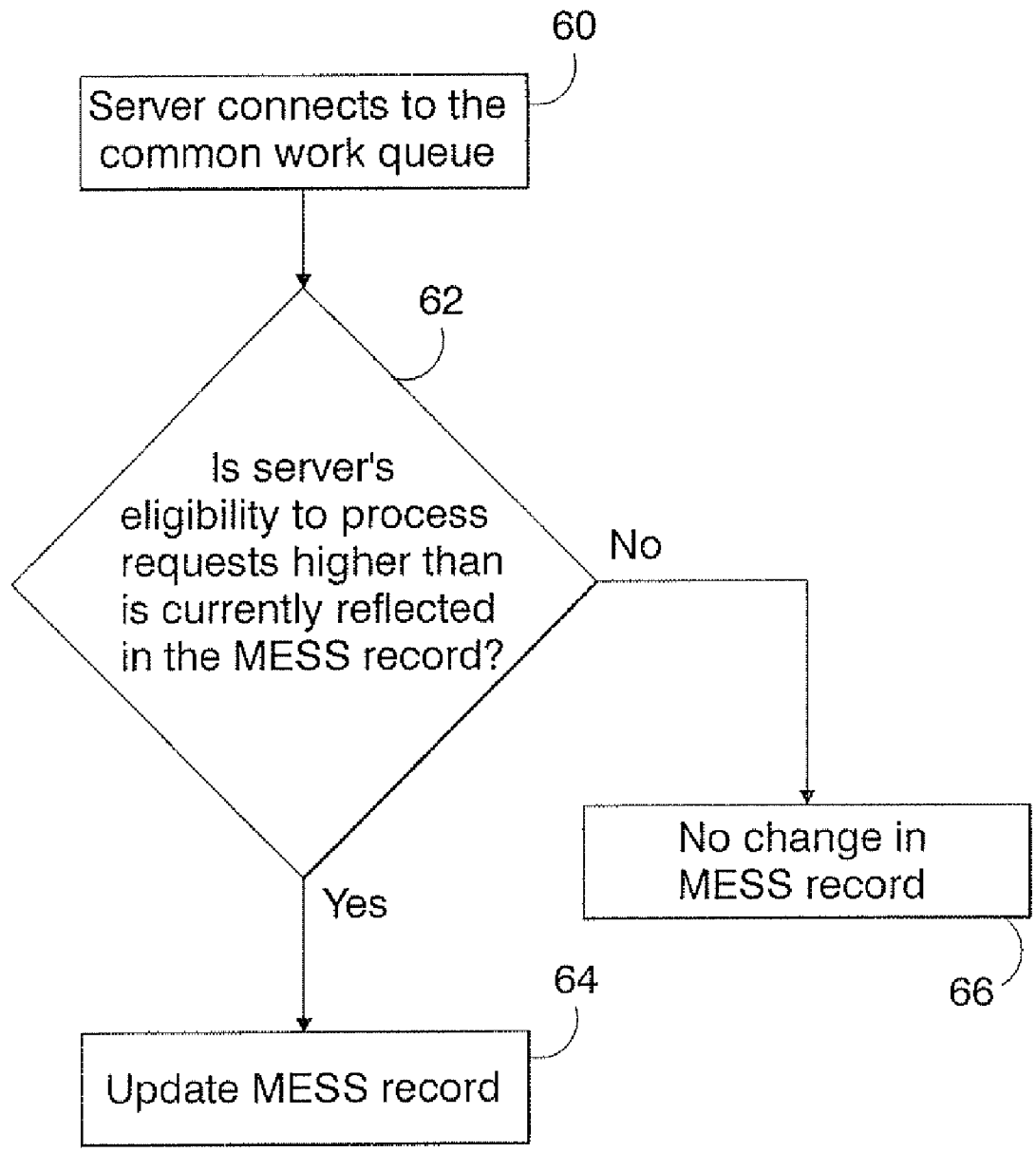
FIG. 3 illustrates a procedure for updating a most eligible server status record.

FIG. 3 shows a procedure for updating a most eligible server status record. As represented at steps 60 and 62, when a server connects to the common work queue, it determines if its eligibility to process requests is greater than is currently reflected in the MESS record. If so, then at step 64 the MESS record is updated; and if not, then, as represented by step 66, no change is made in the MESS record. The record may also be updated when there is a change in eligibility of the connected servers. A record of the eligibility status of each server may be maintained in order to make this determination. When a server disconnects from the common work queue, then the MESS record may be updated if the status of the MESS has changed.

The processing needed to maintain and update the MESS record may be done by any suitable processor means. For instance, the queue server 22 may be used to maintain and update this list, one or more of the processing systems 14 may be used for this purpose, or a separate device may be provided to perform these functions. Also, depending on the specific environment in which the present invention is employed, this processor means may include a single processor or plural processors. For instance, depending on the specific system in which the invention is used, the MESS record may be maintained and updated by a standard personal computer having a single processing unit, or by any other suitable type of computer, including, for instance, computers having plural or multiple processor units. Further, it may be noted, the needed processing may be done principally by software, if desired, principally by hardware, or by a combination of software and hardware.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A server management system comprising:
   a shared queue;
   a plurality of servers each operable to determine whether it has capacity to process a message, and if determined to have the capacity, further operable to dequeue a message in the shared queue, process the message and place one or more responses in the shared queue;
   at least one client for transmitting messages to the shared queue and receiving messages in the shared queue from the plurality of servers;
   a list having a most eligible server status record accessible by said client, the most eligible server status record being updated when one or more of the plurality of servers connects to the shared queue and determines that its eligibility to process requests is greater than is currently reflected in the most eligible server status record, the most eligible server status record further being updated when one or more of the plurality of servers disconnects from the shared queue; and
   processor for maintaining the list further indicating whether at least one of the plurality of servers is eligible and available to process a particular message from the at least one client, the list further indicating one or more types of messages eligible to be processed by said at least one of the plurality of servers, said at least one client reading the list before placing said particular message to the shared queue to determine if a server is available to process said particular message, said at least one client enqueuing said particular message in the shared queue only if it is determined that a server is available,
   wherein if there is a change in the most eligible server status record, the client is notified of the change, and if the most eligible server status record is lower than its previous status, the client is provided with an option of removing one or more requests from the shared queue for which there is no longer a server eligible to process.

2. A server management system according to claim 1, wherein:
   the processor is further operable to maintain changes in the list.

3. A server management system according to claim 1, wherein the at least one client reads said list, before the at least one client transmits a message of a given type to one of the plurality of servers, to determine whether at least one of the plurality of servers is eligible to process messages of a given type.

4. A server management system according to claim 1, wherein the processor notifies the at least one client when changes are made to said list.

5. A server management system according to claim 1, wherein the at least one client includes for removing messages from the plurality of servers in case there is no longer a server eligible to process the messages.

6. A non-transitory program storage device readable by machine, tangibly embodying a program of instructions executable by the machine to perform method steps for managing a plurality of servers, said method steps comprising:
   providing a shared queue;
   using a plurality of servers each operable to determine whether it has capacity to process a message, and if determined to have the capacity, further operable to dequeue a message in the shared queue, process the message and place one or more response messages in the shared queue;
   using at least one client to transmit messages to the shared queue and to receive messages in the shared queue from the plurality of servers;
   establishing a list having a most eligible server status record accessible by said client, the most eligible server status record being updated when one or more of the plurality of servers connects to the shared queue and determines that its eligibility to process requests is greater than is currently reflected in the most eligible server status record, the most eligible server status record further being updated when one or more of the plurality of servers disconnects from the shared queue; and
   using a processor for maintaining the list further indicating whether at least one of the plurality of servers is eligible and available to process a particular message from the at least one client, the list further indicating one or more types of messages eligible to be processed by said at least one of the plurality of servers, said at least one client checking the list before transmitting said particular message to the shared queue to determine if a server is available to process said particular message, said at least one client enqueuing said particular message in the shared queue only if it is determined that a server is available,
   if there is a change in the most eligible server status record, notifying the client of the change, and if the most eligible server status record is lower than its previous status, providing the client an option of removing one or more requests from the shared queue for which there is no longer a server eligible to process.

7. A program storage device according to claim 6, wherein:
   the processor is further operable to maintain changes in the list.

8. A program storage device according to claim 6, wherein said method comprises the further step of, the at least one client reading said list, before the at least one client transmits a message of a given type to one of the plurality of servers, to determine whether at least one of the plurality of servers is eligible to process messages of the given type.

9. A program storage device according to claim 6, wherein said method comprises the further step of using the processor to notify the at least one client when changes are made to said list.

10. A program storage device according to claim 6, wherein said method comprises the further step of, the at least one client removing messages from the plurality of servers in case there is no longer a server eligible to process the messages.

11. A data processing system comprising:
    a common queue;
    a plurality of servers for processing messages of different types, each operable to determine whether it has capacity to process a message, and if determined to have the capacity, further operable to dequeue a message in the common queue, process the message and place one or more response messages in the common queue;
    at least one client for transmitting messages to the common queue and receiving messages in the common queue from the plurality of servers;
    a list having a most eligible server status record accessible by said client, the most eligible server status record being updated when one or more of the plurality of servers connects to the shared queue and determines that its eligibility to process requests is greater than is currently reflected in the most eligible server status record, the most eligible server status record further being updated when one or more of the plurality of servers disconnects from the shared queue; and processor for maintaining the list further indicating whether, for each of the different types of messages, at least one of the plurality of servers is eligible and available to process said each of the different types of messages, the list further indicating one or more types of messages eligible to be processed by said at least one of the plurality of servers, said at least one client checking the list before transmitting a particular message to the common queue to determine if a server is available to process said particular message, said at least one client enqueuing said particular message in the common queue only if it is determined that a server is available, wherein if there is a change in the most eligible server status record, the client is notified of the change, and if the most eligible server status record is lower than its previous status, the client is provided with an option of removing one or more requests from the shared queue for which there is no longer a server eligible to process.

12. A data processing system according to claim 11, wherein the processor is further operable to maintain changes in the list.

13. A data processing system according to claim 11, wherein the at least one client includes for removing messages from the plurality of servers in case there is no longer a server eligible to process the messages.

* * * * *